May 24, 1966 V. WOUK 3,253,189
PROTECTIVE CIRCUITRY
Filed Feb. 5, 1963
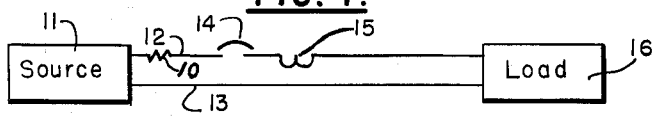
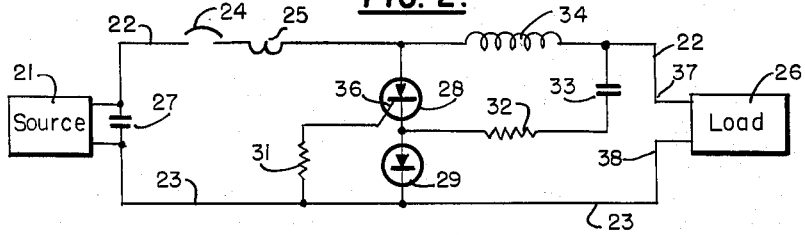
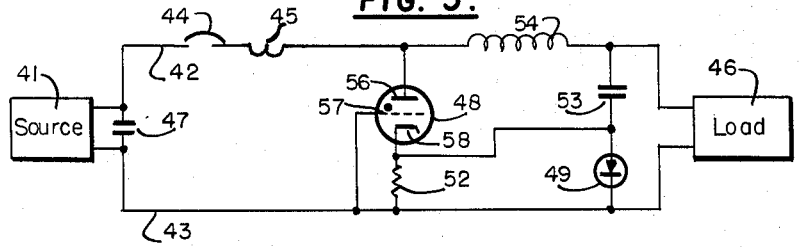
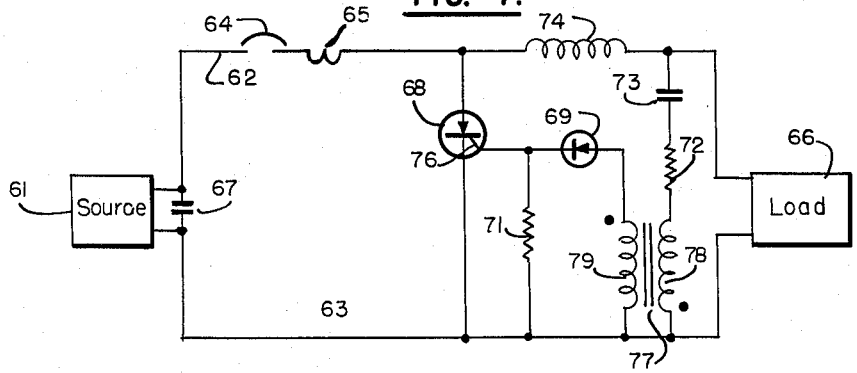
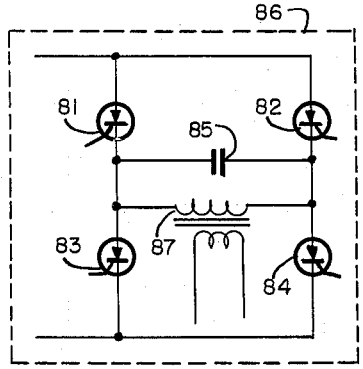
INVENTOR
Victor Wouk
BY William Grobman
ATTORNEY United States Patent Office 3,253,189
Patented May 24, 1966

3,253,189
PROTECTIVE CIRCUITRY
Victor Wouk, New York, N.Y., assignor to Electronic Energy Conversion Corporation, New York, N.Y.
Filed Feb. 5, 1963, Ser. No. 256,280
5 Claims. (Cl. 317—16)

This invention relates to protective circuits, and, more particularly, to electrical circuits for the automatic protection of electrical circuitry and equipment.

Generally, the source of electrical energy is the particular portion of an electrical circuit which is protected from overloads. In the past, this protection has taken the form of magnetically or thermally operated overload switches which automatically operate to open the circuit between the source and the overload. These circuit breakers rely upon the sensing of an overload current. Thus, by the time the circuit breakers are conditioned to operate, the current flow in the circuit is already excessive, and the operation of the mechanical devices thereafter occupies some little time. Because of this, the prior art devices have always permitted the protected portion of the circuit to be exposed to a substantial overload before these devices finally operate. Many electrical devices can have safety factors built into them, by increasing the insulation of the unit or by providing better heat dissipation, for example, but this usually adds appreciably to the cost of the items and also means that many of the devices are operated at substantially below their rated values, and, therefore, uneconomically. In addition, there are many electrical devices which cannot withstand any appreciable overload for more than an extremely short interval of time. Semiconductors and photosensitive devices are two which are in that category. Therefore, a fault in a circuit will often ruin many portions of the circuit even if the source of energy is adequately protected.

It is, therefore, an object of this invention to provide a new and improved electrical protective circuit.

It is another object of this invention to provide a new and improved electrical protective circuit which is rapid in its operation.

It is a further object of this invention to provide a new and improved electrical protective circuit which operates upon the sudden drop in potential across a fault.

Other objects and advantages of this invention will become apparent as the following description proceeds, which description should be considered together with the accompanying drawings in which:

FIG. 1 is a schematic diagram of a generalized protective circuit;

FIG. 2 is a schematic circuit diagram of one form of circuit according to this invention;

FIG. 3 is a schematic circuit diagram of a second form of protective circuit according to this invention;

FIG. 4 is a schematic circuit diagram of a third form of circuit according to this invention; and FIG. 5 is a circuit diagram of a typical load for the circuits of FIGS. 1-4.

Referring now to the drawings in detail, and to FIG. 1 in particular, the reference character 11 designates a source of electrical energy. A pair of electrical transmission lines 12 and 13 serve to conduct the electrical energy from the source 11 to a load 16 through a limiting resistor 10 and an overload switch 14 which includes a control coil 15. The type of load 16 is immaterial to this invention so long as the rating of the load 16 is within the rating of the source 11.

Normally, the source 11 supplies electrical energy, and the load 16 dissipates it at a rate well within the capacities of both. However, when a fault occurs, between the lines 12 and 13 or within the load itself, the impedance into which the source 11 operates suddenly drops, and the current output of the source increases. The sudden increase manifests itself over a period of time, generally building up rapidly to a maximum amount in a time interval which is determined by the inductance in the circuit, and then remaining at the maximum level until the occurrence of the next event. Very often, the next event is the opening of the switch 14. As the switch opens, the current drops gradually, decaying over an interval of time until the arc in the switch 14 is finally extinguished and the energy stored in the reactances in the circuit has been dissipated. By this time, the load 16 or the source 11 may well have been subjected to an overload for a time sufficient to cause either of them permanent damage. Clearly, the overload currents build more rapidly than the mechanical switches can respond.

Damage to electrical equipment is determined by the amount of energy dissipated. This, in turn, is determined by the current flow and the time during which the current is flowing. The greater the flow of current, the greater the danger of damage; and the greater the length of time that the current flows, the greater the danger of damage. This is particularly true of semiconductor devices and space discharge devices. To limit the current flowing in a short-circuit such as in the system of FIG. 1, a current limiting resistor 10 is used. But in a power supply system, the current limiting resistor 10 is in the circuit at all times. Therefore, considering a resistor 10 having only one ohm resistance, in a circuit which normally carries 50 amperes, that current limiting resistor dissipates 2500 watts. In the interests of economy, it would appear that reducing the time during which components in a circuit are exposed to the short-circuit current would pay dividends over limiting the amount of current which could flow. But, as pointed out above, mechanical switches such as the circuit breaker 14 are slow in their operation.

The circuit of FIG. 2 will overcome this time problem present in the circuit of FIG. 1. A source 21 of direct current transmits power along transmission lines 22 and 23. A circuit breaker 24 having an operating coil 25 is inserted in line 22 to open the circuit in case of an abnormally high current flow from the source 21. A capacitor 27 is connected across the output of source 21 and serves to integrate the output to provide a smooth flow without appreciable ripple. The capacitor 27 may well be part of a filter network. Between the circuit breaker 24 and the load 26, a branch circuit, containing a silicon controlled rectifier 28 and a diode 29 in series, is connected. An impedance 34, shown in FIG. 2 as an inductor, but which may also be a resistor, is connected in line 22 between the branch circuit and the load 26, and a capacitor 33 and resistor 32 are connected between line 22 at the load 26 and the junction of the controlled rectifier 28 and the diode 29. A resistor 31 connects the control electrode 36 of the rectifier 28 to the line 23.

In normal operation of the circuit of FIG. 2, the circuit breaker 24 is closed and the source 21 supplies electrical energy to the load 26. The capacitors 27 and 33 charge to the voltage applied by the source 21 to the load 26, the diode 29 conducting the charging current for the capacitor 33. Once the capacitor 33 is charged, neither the controlled rectifier 28 nor the diode 29 conduct so long as the circuit operates in normal fashion. When a fault in the load 26 occurs, the impedance of the load suddenly drops, and the potential difference across the points 37 and 38 also drops rapidly to virtually zero. The coil 25 and the inductor 34 oppose the rapid increase of current flow to the load 26, and virtually the entire voltage drop in the circuit appears across the coil 25 and the inductor 34. This means that even though the potential difference between points 37 and 38 is practically zero, the potential across the branch circuit has not dropped appreciably. Thus, when the impedance of the load 26 drops to zero, the voltage across the capacitor 33 because of its charge is applied across the series arrangement of the resistor 32, the control electrode 36 and the remainder of the rectifier 28. This is sufficient to initiate conduction in the rectifier 36. The capacitor 33, which is of small capacitance, rapidly discharges, and current now flows through the branch circuit comprising the controlled rectifier 28 and the diode 29. The impedance of the branch circuit is low when it is conducting, and the capacitor 27 rapidly discharges through the branch circuit without subjecting the load itself to excessive currents, and protecting the delicate components therein. In the meantime, the path through the branch circuit does not include the inductor 34, and the current flow therefore builds rapidly. The coil 25 trips open the circuit breaker 24, and removes the source 21 from the circuit. Even though it may take tens of milliseconds to open the circuit breaker 24, the short circuiting of the load by the conduction of the branch circuit requires only microseconds. Thus, excessive currents are permitted to flow through the load 26 for only an interval of time which is too small to cause it damage. The capacity of the controlled rectifier 28 is selected to readily handle the current flow for the time necessary to open the circuit breaker 24. Thus, the circuit is rapidly and effectively protected.

A second form of the protective circuit of this invention is shown in FIG. 3. This embodiment comprises a source 41 of direct current feeding energy through lines 42 and 43 to a load 46. A circuit breaker 44 which includes an operating control coil 45 is in series with an inductor 54 in the line 42 between the source 41 and the load 46. A branch circuit including a thyratron 48 in series with a resistor 52 is connected across the supply line 42 and 43. The thyratron 48 includes an anode 56, a control grid 57 and a cathode 58. The thyratron 48 may be either a hot or a cold cathode tube, but a cold cathode tube is preferred. A capacitor 53, in series with a diode 49, is connected across the branch circuit at the load 46. The control grid 57 is connected to the line 43.

In normal operation, when the source 41 is supplying direct current to the load 46, the capacitors 47 and 53 charge to the voltage applied to the load 46. The capacitor 53 charges through the diode 49 which conducts while the capacitor charges. So long as the current flow to the load 46 is within the operating ranges of the source 41 and the load 46, most of the voltage drop in the circuit appears across the load. However, should the load 46 suddenly develop a fault, its impedance drops drastically, and the potential drop in the circuit appears essentially across the coil 45 and the inductor 54. Also, since the impedance of the load 46 drops to virtually zero, the potential of the line 43 at the load approaches the potential of the line 42 at the load. This effectively applies the potential of the charged capacitor 53 across the resistor 52, through which it discharges. The voltage drop across the resistor 52 due to the discharge of the capacitor 53 drives the control grid 57 positive with respect to the cathode 58, and the thyratron 48 conducts, short-circuiting the load 46. In the meantime, the inductor 54 and the coil 45 have resisted the sudden increase in current to the load 46. When the thyratron 48 fires, it effectively removes the impedance of the inductor 54 from the circuit, permitting a sudden rise in the flow of current through the coil 45, and the circuit breaker 44 opens.

The firing of the thyratron 48 is quite rapid, seldom taking as long as 0.1 millisecond. The capacitor 47 discharges through the thyratron 48. As the current flow through the circuit increases, the circuit breaker control coil 45 trips the breaker 44 to open the circuit and terminate all current flow. Thus, although tens of milliseconds may be required for the circuit breaker to open, the low impedance of the branch circuit bleeds the excessive current and prevents this current from injuring delicate components in the load 46.

In each of the foregoing embodiments, the collapse of the voltage drop across the load due to the sudden decrease in the impedance of the load caused the application of a capacitor charge to the control electrode of a controlled conductive device across a diode. FIG. 4 illustrates another embodiment of the protective circuit of this invention. A source 61 transmits direct current through lines 62 and 63 to a load 66. In series in line 62 are a circuit breaker 64 including its control coil 65 and an impedance 74, shown here as an inductor, but which could also be a resistor. Two branch circuits are connected across the lines 62 and 63; a first branch including a silicon controlled rectifier 68 which has a control electrode 76, and the other branch circuit containing a capacitor 73, a resistor 72, and the primary winding 78 of a pulse transformer 77. The secondary winding 79 of the pulse transformer 77 is connected through a diode 69 to the control electrode 76 of the rectifier 68. A resistor 71 is connected between the control electrode 76 and the line 63. In addition, the circuit may also include between the secondary 79 and the control electrode 76 other elements such as pickup suppressing capacitors, clipping diodes, and the like, which improve the reliability of the circuit and make it more independent of outside influences.

As in the other circuits described above, during normal operation, the source 61 supplies electrical energy to the load 66, charging the capacitors 67 and 73 to substantially the output potential of the source. When a fault occurs in the load 66, the impedance of the load 66 suddenly drops, reducing the potential thereacross. As the impedance of the load 66 falls, so does the voltage across it permitting the capacitor 73 to discharge through the load 66, the primary 78 of the transformer 77, and the resistor 72. The total impedance in the path, including that of the load 66, the primary 78 and the resistor 72, determines the rate at which the capacitor 73 discharges. For this reason, the resistor 72 is maintained low in value. As the discharge pulse from the capacitor 73 passes through the primary 78, it induces a potential in the secondary 79 to apply a positive-going enabling pulse to the control electrode 76 of the controlled rectifier 68. The rectifier 68 conducts, effectively removing the inductor and the load 66 from the circuit and permitting the rapid increase in the current through the coil 65. The initial surge of current transmitted through the rectifier 68 comes from the charged capacitor 67 which discharges. This initial surge also serves to alert the circuit breaker control winding 65 to an overload and open the circuit breaker 64. By the time the current output from the source 61 begins to reach dangerous proportions, the circuit breaker 64 opens to disable the entire circuit. Thus, both the load 66 and the source 61 are protected by the operation of the protective circuit.

Heretofore, the load which is being protected by the circuit of this invention has been illustrated merely by a block and referred to in general terms. FIG. 5 illustrates one specific form that such a load might take. A bridge circuit is formed of four controlled rectifiers 81, 82, 83, and 84 controlled by a capacitor 85 which is connected across the primary winding 87 of a transformer. In normal operation, two of the rectifiers 81–84 are fired to conduct through the primary of transformer 87, conduction ceasing when the other pair of rectifiers 81–84 are fired, due to the well-known action of the commutating capacitor 85 extinguishing the previously conducting rectifiers. Thus, rectifiers 81 and 84 are rendered conductive at the same time with the current flowing through the capacitor 85 in a first direction. Then rectifiers 82 and 83 are rendered conductive, permitting the capacitor 85 to first discharge, and then to charge in the opposite direction. This operation may be repeated for an indefinite length of time with no ill effects, since the amount of current passing through any of the rectifiers 81–84 is determined mainly by the load impedance as transformed into the primary circuit. However, should the two non-conducting rectifiers inadvertently become conductive before the others have ceased conducting, then a short circuit is established in the load with no immediate means for terminating conduction in any of the rectifiers. This means that short-circuit current will flow through the rectifiers until external means terminates conduction, and they could readily be damaged unless the external means operates rapidly. Thus, it can be seen that the use of a circuit breaker alone is not sufficient to protect the type of load illustrated in FIG. 5, and the circuits of FIGS. 2–4 are required.

This application has described new and improved protective circuits for the protection of electrical equipment. The circuits of this invention provide a rapid action to prevent delicate components in a defective load from being damaged by exposure to excessive current for an undue length of time. To provide this action, an electronic short circuit is established in an interval of microseconds. This short circuit effectively removes the load from the circuit, and, at the same time, permits a rapid build-up of current through the operating coil of the electromagnetic circuit breaker. Thus, during the comparatively long period of time that it takes for the circuit breaker to achieve its function, the delicate portions of the circuit are protected from excessive flow. It is realized that the above description may indicate to those skilled in the art other forms in which the principles of this invention might be used without departing from the spirit thereof. It is, therefore, intended that this invention be limited only by the scope of the appended claims.

What is claimed is:

1. A rapidly operating protective circuit adapted to protect delicate components from the effects of excessive current for a comparatively long interval of time, said circuit comprising a transmission path for coupling direct current from a source of direct current to a load, a first normally non-conductive shunt path connected across said load between a first relatively high potential portion of said transmission path and a point of reference potential therein, said shunt path containing a normally non-conductive controlled electrical discharge device which can be triggered into a highly conductive state, a second shunt path in parallel with said first shunt path and including a capacitor connected to be charged when current flows from said source to said load, an inductance connected in said transmission path between said electrical discharge device and the load for preventing the short-circuiting of said electrical discharge device and developing a counter-voltage tending to oppose the change in current therethrough upon short-circuiting of the load, and means for establishing a discharge circuit for the capacitor when the load is short-circuited and connections to said discharge device which couples a voltage resulting from the discharge of said capacitor to said discharge device which triggers the same into said conductive state effectively to short-circuit said transmission path intermediate the source and the load, and switching means in said transmission path between the direct current source and said discharge device which means is responsive to the rise in current caused by the conduction of said discharge device by disconnecting said source from the circuit.

2. The protective circuit of claim 1 wherein said second shunt path includes in series with said capacitor the primary winding of a transformer, said transformer having a secondary winding connected to said discharge device for applying a voltage thereto which triggers the device into said conductive state when said capacitor discharges upon short-circuiting of the load through the primary winding of the transformer.

3. A rapidly operating protective circuit adapted to protect delicate components from the effects of excessive currents for a comparatively long interval of time, said circuit comprising a transmission path for coupling electrical energy from a source to a load, a normally nonconductive shunt path connected across said load between a first relatively high potential portion of said transmission path and a portion of reference potential therein, said shunt path containing a normally non-conductive controlled electrical discharge device which can be triggered into a highly conductive state, a capacitor connected in said circuit to be charged when energy flows from the source to the load, said capacitor being coupled at one end to the high potential side of said transmission path, a unidirectional conductive device coupled between the other end of said capacitor and said portion of reference potential of said transmission path, said unidirectional conductive device permitting the charging but not the discharging of said capacitor therethrough, means responsive to the sudden decrease in potential across the load for coupling the voltage across said capacitor to the reference potential side of said electrical discharge device to trigger said device into said conductive state effectively to short-circuit said transmission path intermediate the source and the load, and switching mechanism in said transmission path between the source and the shunt path, the rise of current caused by the conduction of said shunt path being effective to operate said switching mechanism to disconnect said source from said circuit.

4. The circuit defined in claim 3 further including means for connecting the junction between said capacitor and said unidirectional conductive device to the reference potential side of said electrical discharge device, the other end of said electrical discharge device being connected to the high potential portion of said transmission path wherein a low impedance path through the load effectively connects the high potential side of said capacitor to the reference potential side of said electrical discharge device to apply a high potential thereto which then causes said discharge device to conduct.

5. The circuit defined in claim 4 further including a low resistance impedance connected in the high potential side of said transmission path between said discharge device and said capacitor wherein said impedance is operative to maintain the potential at said discharge device high until the discharge device becomes conductive at which time said impedance is removed from said circuit.

References Cited by the Examiner

UNITED STATES PATENTS

| | | | |
|---|---|---|---|
| 2,571,027 | 10/1951 | Garner | 317—16 X |
| 2,815,446 | 12/1957 | Coombs | 317—51 X |
| 2,840,766 | 6/1958 | Wouk | 317—16 |
| 2,925,548 | 2/1960 | Scherer | 317—16 X |
| 3,158,786 | 11/1964 | Hurtle | 317—33 |

SAMUEL BERNSTEIN, *Primary Examiner.*

RAPHAEL V. LUPO, *Assistant Examiner.*